Sept. 28, 1954  L. W. SHEA ET AL  2,690,277
MATERIAL HANDLING EQUIPMENT

Filed Nov. 5, 1951  7 Sheets-Sheet 1

INVENTORS
Lindsey West Shea and
BY  Joseph C. Streb
Frease, Bishop & Hamilton
ATTORNEYS Sept. 28, 1954    L. W. SHEA ET AL    2,690,277
MATERIAL HANDLING EQUIPMENT
Filed Nov. 5, 1951    7 Sheets-Sheet 3

INVENTORS
Lindsey West Shea and
Joseph C. Streb
By Frease, Bishop & Hamilton
ATTORNEYS

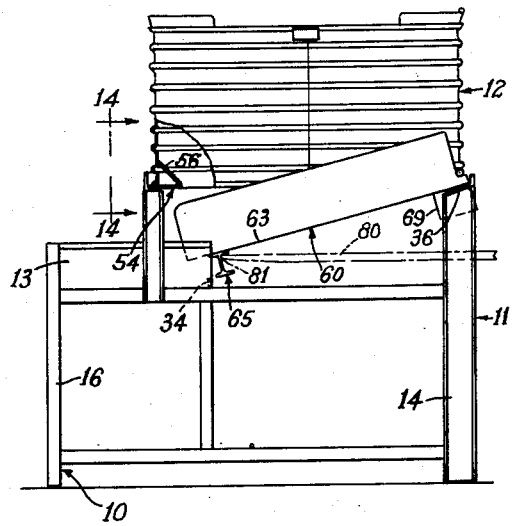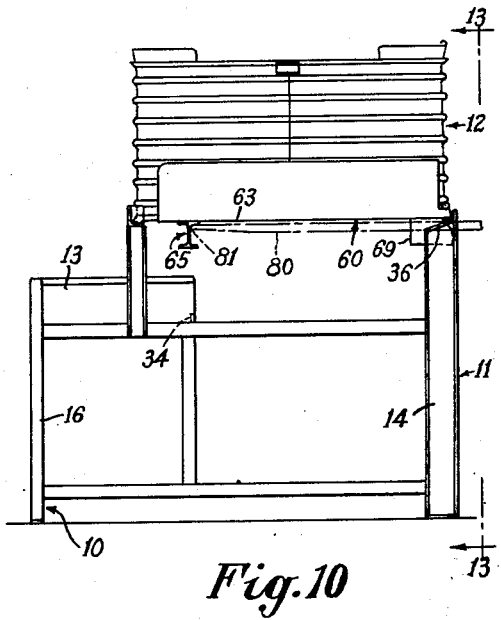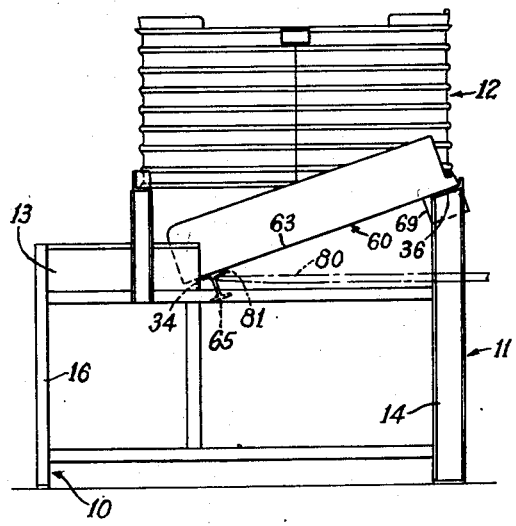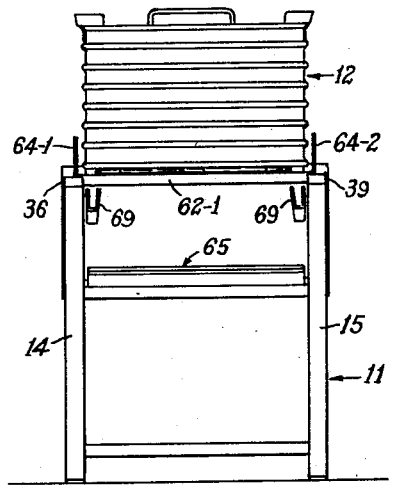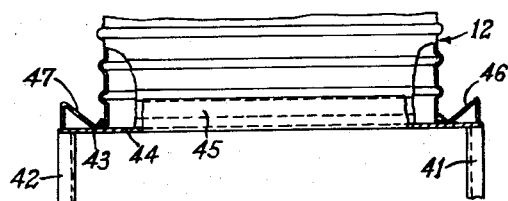
INVENTORS
Lindsey West Shea
Joseph C. Streb
BY Frease, Bishop & Hamilton
ATTORNEYS Sept. 28, 1954  L. W. SHEA ET AL  2,690,277
MATERIAL HANDLING EQUIPMENT
Filed Nov. 5, 1951  7 Sheets-Sheet 7

INVENTORS
Lindsey West Shea &
Joseph C. Streb
BY
Freese, Bishop & Hamilton
ATTORNEYS Patented Sept. 28, 1954

2,690,277

UNITED STATES PATENT OFFICE 2,690,277

MATERIAL HANDLING EQUIPMENT

Lindsey West Shea and Joseph C. Streb, Canton, Ohio, assignors to The Union Metal Manufacturing Company, Canton, Ohio, a corporation of Ohio Application November 5, 1951, Serial No. 254,952

35 Claims. (Cl. 222—185)

The invention or discovery relates to material handling equipment including a bottom dump box unit having walls forming an upwardly and downwardly opening enclosure, and a bottom wall constituting a closure for the lower opening of the enclosure walls, the bottom wall being hinge mounted at one end on the lower end of one of the enclosure walls.

In prior constructions of dump box units including a hinged bottom wall, considerable difficulty has been encountered in manipulating the hinged bottom wall, and in supporting the dump box unit at the location where the material contained in the dump box unit is to be dumped. Fork lift trucks are used very frequently in handling and transporting dump box units, and it is desirable that a fork lift truck should be able to insert its forks beneath a dump box unit from more than one side of the dump box unit, in order to handle and transport the dump box units in manufacturing plants where machines or assembly lines are crowded closely together. It is also desirable to have complete control of the hinged bottom wall of a bottom dump box unit, when the hinged bottom wall is caused to swing down to the open position from the closed position for dumping the material contained in the bottom dump box unit. It is furthermore desirable to support the dump box unit at a fixed position relative to the location where the material contained in the dump box unit is to be dumped, and that the control of the hinged bottom wall of a bottom dump box unit should be effective independently of the support for the dump box unit. In prior constructions of dump box units including a hinged bottom wall, one or more of these desirable characteristics are absent.

The objects of the present invention or discovery include the provision of improved material handling equipment combinations, each including as components a bottom dump box unit and a stand unit for supporting the bottom dump box unit, the bottom dump box unit including walls forming an upwardly and downwardly opening enclosure and a bottom wall which is hinge mounted on one of the enclosure walls, the bottom wall being arranged for providing a closure for the lower opening of the enclosure when the dump box unit is standing on the floor or supported on the forks of a fork lift truck and the bottom wall of the dump box unit being arranged to drop to open position when the dump box unit is seated on the stand unit, the opening and closing of the bottom wall being independent of the supporting of the dump box unit on the stand, and being controllable by lowering and raising of the forks of a fork lift truck.

Further objects of the present invention or discovery include the provision of such improved material handling equipment combinations, each including as components a bottom dump box unit and a stand unit for supporting the bottom dump box unit, and in which each unit has a simplified arrangement of parts, permitting economical manufacture and maintenance, and convenience in use.

The foregoing and other objects are attained by the material handling equipment combinations, component bottom dump box units and stand units, parts, and sub-combinations, which comprise the present invention or discovery, the nature of which is set forth in the following general statement, and preferred embodiments of which are set forth in the following description, and which are particularly and distinctly pointed out and set forth in the appended claims forming part hereof.

The nature of the improved material handling equipment combinations and the component bottom dump box units and stand units of the present invention or discovery, may be stated in general terms as including an improved bottom dump box unit having side and end walls forming a preferably rectangular enclosure having an upper end opening and a lower end opening, a bottom closure for the lower end opening of the enclosure, a hinge connection of the bottom closure with one of the enclosure walls, and end supports for the box unit, one set of rear end supports being adjacent the hinge connection of the bottom closure with the one enclosure wall, and an opposite front end support on the enclosure wall opposite the hinge connection and beyond the adjacent end of the bottom closure. The improved stand unit for supporting the improved bottom dump box unit and permitting independent lowering and raising of the bottom closure, includes preferably a three-dimensional frame of structural members having a front and a rear end, an upwardly opening pan on the top of the front end of the frame, one pair of laterally spaced struts extending upwardly from the frame above the pan and supporting on their upper ends a laterally extending stringer, and another pair of laterally spaced struts extending upwardly from the rear end of the frame, each of the rear struts having a seat plate on its upper end, the seat plates being spaced to receive and seat the rear end supports for the box unit and the stringer being spaced to receive and seat the front end support of the box unit.

By way of example, embodiments of the improved material handling equipment and component units of the present invention or discovery are illustrated in the accompanying drawings forming part hereof, in which:

Fig. 10 is a side elevational view of a material handling equipment combination of the units of Figs. 3 to 8 arranged as generally shown in Fig. 1, just after the fork of a fork lift truck has lowered the bottom dump box unit onto the stand, and before commencement of the dropping of the bottom, the fork being shown in dot-dash lines;

Fig. 11 is a view similar to Fig. 10, portions being broken away and shown in section, and showing the bottom of the dump box unit in an intermediate position, during dropping thereof on the lowering fork of the fork lift truck;

Fig. 12 is a view similar to Fig. 11 showing the bottom of the dump box unit dropped to its lowermost position;

Fig. 13 is an end elevational view looking in the direction of the arrows 13—13, Fig. 10;

Fig. 14 is an enlarged fragmentary end elevational view with portions broken away and shown in section, looking in the direction of the arrows 14—14, Fig. 11;

Similar numerals refer to similar parts throughout the drawings.

Figure 1:
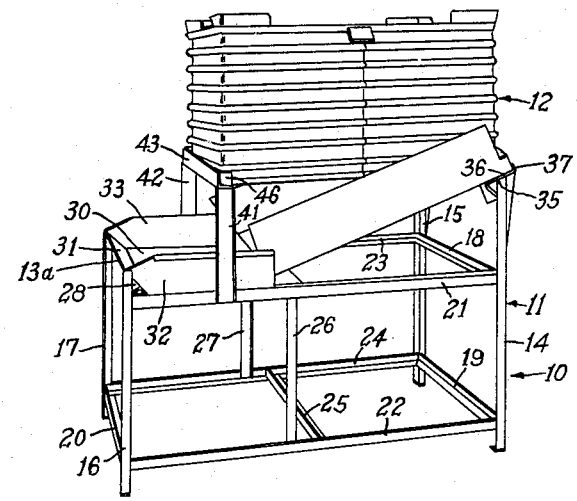
Figure 1 is a perspective view showing one embodiment of the improved material handling equipment including a lower stand unit, and an upper bottom dump box unit, with the box supported on the stand, and with the box bottom dropped to a position permitting material to flow therefrom onto the tray of the stand unit.

The improved material handling equipment combination, shown in Fig. 1 and in Figs. 10 to 13 inclusive, is indicated generally by 10, and includes an improved lower stand unit indicated generally by 11, and an improved upper bottom dump box unit indicated generally by 12.

Figure 2:
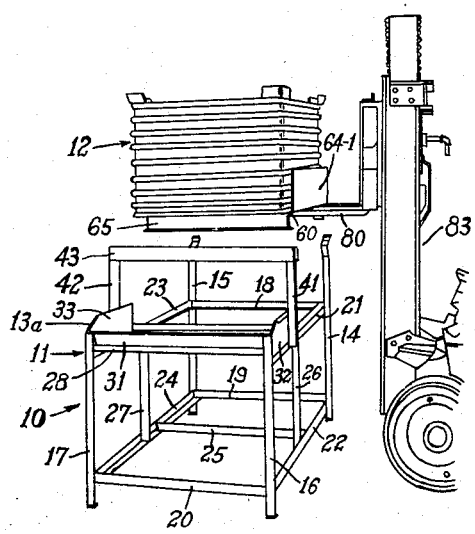
Fig. 2 is a fragmentary perspective view showing a fork lift truck supporting the box unit of Fig. 1 in an elevated position above the stand unit of Fig. 1.
Figure 3:
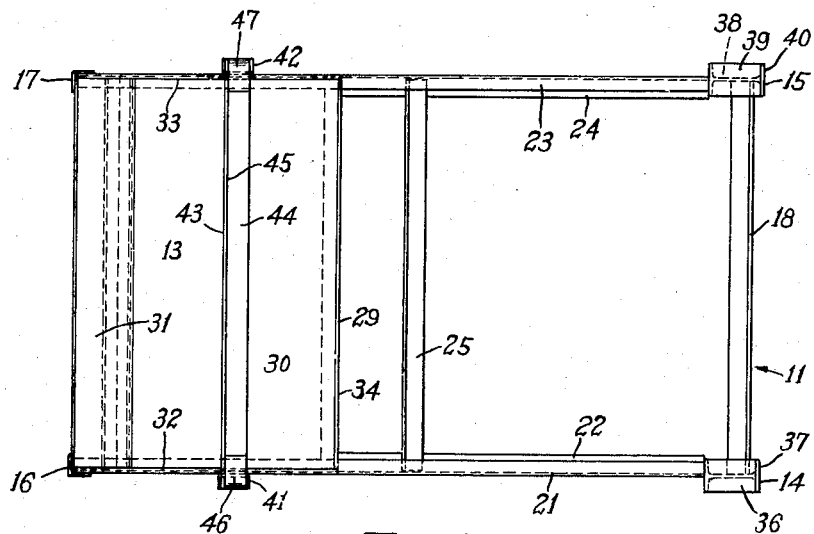
Figs. 3 and 4 are top plan and side elevation views of a stand similar to that shown in Fig. 1, but of slightly modified construction.
Figure 4:
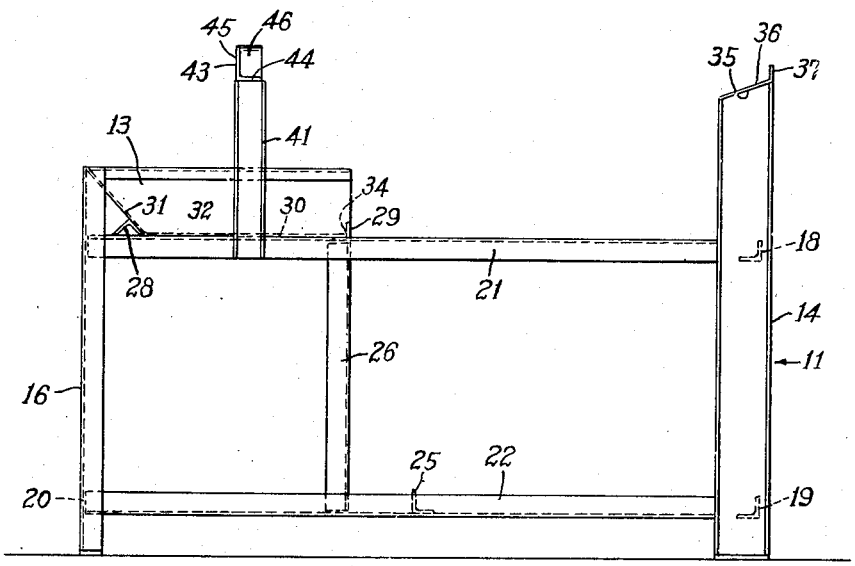

The details of construction of the improved lower stand unit 11 are best shown in Figs. 1, 3 and 4. The improved stand unit 11 includes a generally rectangular three-dimensional frame of structural members, the frame having front and rear ends at the left and right in Figs. 3 and 4. At the front end of frame 11 an upwardly opening pan 13 is provided for receiving material dumped therein from a bottom dump box unit 12 supported on stand unit 11 as shown in Fig. 1. In Figs. 1 and 2 the pan 13 is slightly different from the pan 13 shown in the remaining figures in that its front end is cut away at 13a.

Stand 11 includes laterally spaced rear struts 14 and 15, and front struts 16 and 17. The rear struts 14 and 15 are angle members in Figs. 1 and 2 and are I-beam members in the remaining figures while the front struts 16 and 17 are angle members in each instance.

As shown, the struts 14 and 15, and 16 and 17, are all uprights, the struts 14 and 15 determining a rear end plane parallel with a front end plane determined by the struts 16 and 17. Moreover, the struts 14 and 16 determine a side plane parallel with a side plane determined by the struts 15 and 17, the side planes being perpendicular to the rear and front end planes.

The rear end struts 14 and 15 are connected with each other by vertically spaced horizontal upper and lower stringers 18 and 19. The front end struts 16 and 17 are connected with each other by a lower stringer 20.

The rear and front struts 14 and 16 are connected with each other by vertically spaced horizontal upper and lower stringers 21 and 22; and the rear and front struts 15 and 17 are connected with each other by vertically spaced horizontal upper and lower stringers 23 and 24.

Intermediate their ends the lower angle members 22 and 24 are connected by a laterally extending stringer 25.

Intermediate their ends, the upper and lower horizontal stringers 21 and 22 are connected with each other by strut 26, and the upper and lower stringers 23 and 24 are connected with each other by strut 27. The struts 26 and 27 as shown are angle members.

Adjacent the front end struts 16 and 17, the front ends of the top stringers 21 and 23 are connected by a laterally extending cross stringer 28. Above the upper ends of the struts 26 and 27, the top stringers 21 and 23 are connected by a laterally extending cross stringer 29. The front struts 16 and 17 extend above the front ends of the top stringers 21 and 23.

As shown, each of the stringers in the frame of the stand unit 11 is an angle member.

The top faces of the top stringers 21 and 23 between the laterally extending cross stringers 28 and 29 serve as support seats for the upwardly opening pan 13.

The pan 13 includes a bottom wall 30 seated on the top faces of the top stringers 21 and 23, and the bottom wall 30 has a forward upwardly sloping extension 31 the lower end of which is supported on the cross stringer 28 and the upper end of which is supported on the upper ends of the uprights 16 and 17. The pan 13 also includes side walls 32 and 33 extending upwardly respectively above the top stringers 21 and 23. The rear end of the pan 13 is open and the angle cross stringer 29 includes a flange 34 extending upwardly above the pan bottom wall 30.

The rear upright 14 extends above the top member 21 and has a sloping upper extremity 35 on which is preferably located a seat plate 36 having a rear upwardly extending stop flange 37.

Similarly, the rear upright 15 terminates in a sloping upward extremity 38, provided with a seat plate 39 having a rear upwardly extending stop flange 40. The seat plates 36 and 39 are both in the same plane and slope downwardly towards the front end of the stand 11.

Intermediate the front and rear ends of the pan 13, posts 41 and 42 extend upwardly, respectively, from the top members 21 and 23. Each of the posts 41 and 42 as shown is a channel member, and the upper ends of posts 41 and 42 are in a common horizontal plane. An angle cross member 43 extends between and is supported on the upper ends of the posts 41 and 42. The angle cross member 43 includes a horizontal bottom seat flange 44 and a stop flange 45 extending upwardly therefrom. At the opposite ends of the angle cross member 43 there are preferably provided upwardly and outwardly sloping centering members 46 and 47, respectively, the slopes of which are best shown in Fig. 14.

All the parts and members of the stand 11 are preferably formed of metal, and the connections with each other are preferably welds.

The details of construction of the improved bottom dump box unit 12 are best shown in Figs. 5 to 8, inclusive. As shown, the improved bottom dump box unit 12 includes a rear end wall 50, and a front end wall 51 longitudinally spaced from the rear end wall 50. Each of the walls 50 and 51 are rectangular and are generally parallel with each other and have corner border portions at one side connected with each other by a side wall 52, and corner border portions at the other side connected with each other by a side wall 53. The end walls 50 and 51 and the side walls 52 and 53 form a rectangular enclosure E having an open upper end and an open lower end. The walls 50, 51, 52, and 53 are preferably provided with laterally extending corrugations, as shown.

For the purposes of the present improvements, in the box unit 12, at the lower horizontal border of the front end wall 51 there is located a support and baffle member indicated generally by 54, and which as shown is an angle member which includes a bottom angle wall 55 extending between the side walls 52 and 53 and having an outer edge connected with the lower end of the inner face of the front end wall 51. The member 54 furthermore includes a top angle wall 56 extending upwardly from the inner edge 57 of the bottom wall 55, and the wall 56 has an upper edge connected with the inner face of the front end wall 51 above the bottom wall 55. The bottom wall 55 of the member 54 thus provides horizontally extending supporting means for the front end of the box unit 12 within the enclosure E, and the top wall 56 of the member 54 provides baffle means extending downwardly from the inner face of the front end wall 51 and between the side walls 52 and 53. The lower opening of the enclosure E formed by the lower edges of the rear end wall 50 and the side walls 52 and 53, and the inner edge 57 of the member 54, is thus smaller than the upper opening of the enclosure E.

Closure means indicated generally by 60 are provided for the lower opening of the enclosure E, and improved horizontal hinge means indicated generally by 61 pivotally connect the rear end 62 of the closure means 60 with the lower portion of the rear end wall 50 of the box unit 12.

Figure 6:
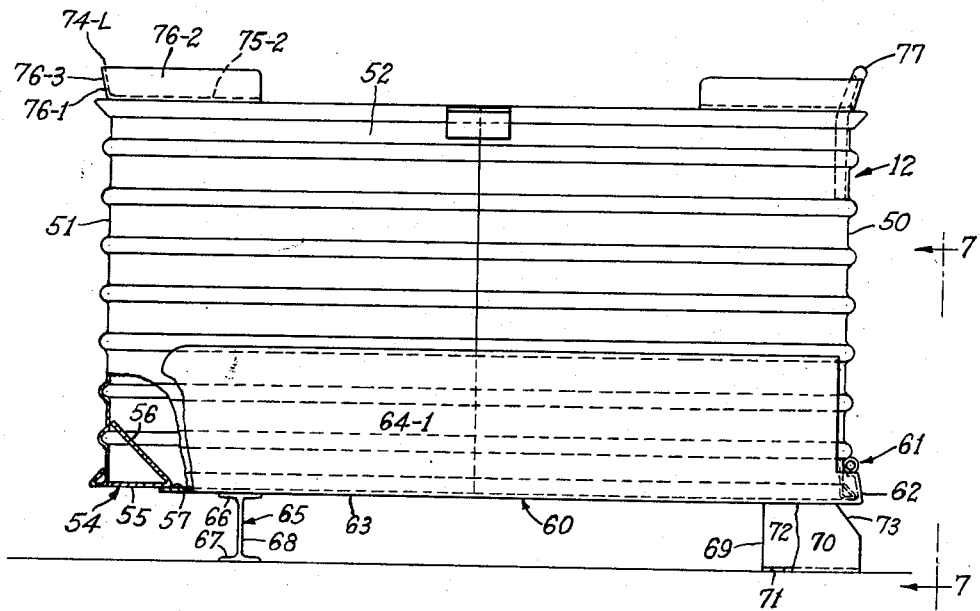

The closure means 60 is shorter than the length of the side walls 52 and 53 of the box 12, and when in the closed position, as shown in Fig. 6, the closure means 60 covers the lower opening of the enclosure E and overlaps the bottom wall 55 of the support and baffle member 54 only for a short distance from the inner edge 57 of the member 54, leaving the greater portion of the width of the bottom wall 55 exposed for supporting the front end wall 51 and the front end corner portions of the side walls 52 and 53 independently of the closure means 60.

Figure 7:
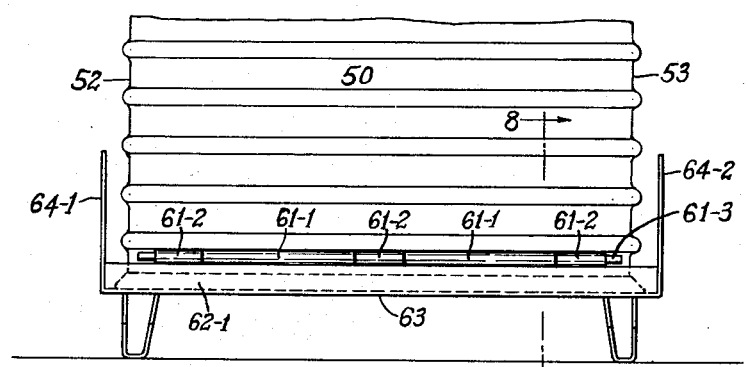
Fig. 7 is a fragmentary and elevational view thereof looking in the direction of the arrows 7—7, Fig. 6.

As shown, and preferably the closure means 60 is in the form of a chute including a bottom wall 63 which is rectangular, and chute side walls 64-1 and 64-2 extend in the same direction from the side edges of the chute bottom wall 63, this direction being upwardly when the closure means 60 is in the closed position. The chute side walls 64-1 and 64-2 are laterally spaced from each other a greater distance than the enclosure side walls 52 and 53. Consequently, when the chute closure means 60 is in the closed position, the chute side wall 64-1 overlaps the enclosure side wall 52, and the chute side wall 64-2 overlaps the enclosure side wall 53, as best shown in Fig. 7.

A laterally extending supporting and stop member 65 is secured to the bottom face of the chute bottom wall 63. As shown, the supporting and stop member 65 is an I-beam having an upper flange 66 and a lower flange 67 and a web 68 extending between the flanges 66 and 67. The web 68 of the supporting and stop means 65 is preferably perpendicular to the planes determined by the parallel chute side walls 64-1 and 64-2, which are parallel with the planes determined by the enclosure side walls 52 and 53. The rear side of the I-beam member 65 constitutes a rearwardly opening channel or trough, for the purposes of the present improvements.

Adjacent the rear edge of the rectangular chute bottom wall 63 there is secured at each of the rear corners of its bottom face a leg 69, which as shown is an upwardly opening U-member formed of sheet metal. The U-member includes an outer leg wall 70, a bottom web wall 71, and an inner leg wall 72. The upper edges of the leg walls 70 and 72 are secured to the bottom face of the chute bottom wall 63. The upper portions of the rear edges of the leg walls 70 and 72 slope upwardly from rear to front and form notches 73 with the rear end portion of the chute bottom wall 63, for the purposes of the present improvements.

Figure 5:
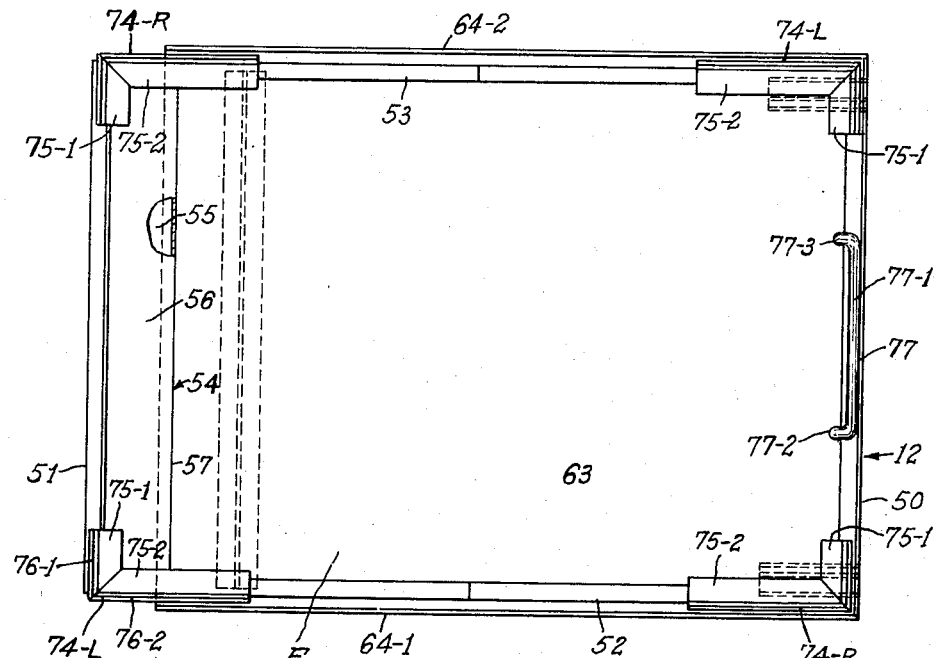
Figs. 5 and 6 are top plan and side elevation views of the bottom dump box unit of Fig. 1.

The box unit 12 furthermore includes a stacking seat member 74-R or 74-L secured on the upper ends of the end and side walls at each corner of the box unit. As best shown in Figs. 5 and 6, each stacking seat member 74-R or 74-L is formed from a length of an angle bar having mitered bottom leg walls 75-1 and 75-2, and upright leg walls 76-1 and 76-2 which are bent at angles to each other at the outwardly sloping corner 76-3.

In each stacking member 74-R or 74-L, the leg walls 75-2 and 76-2 are preferably longer than the leg walls 75-1 and 76-1, as best shown in Fig. 5. The leg walls 75-2 of the seat members 74–R and 74–L on the corners of the enclosure front end wall 51 extend towards the enclosure rear end wall 50 a distance so as to provide seats for the ends of the lower faces of the supporting and stop means 65 of an upper box unit 12, when its closure means is in the closed position, and it is desired to stack the upper box unit 12 upon a similar lower box unit 12 shown in Figs. 5 and 6.

Similarly the seat members 74–R and 74–L on the upper corners of the enclosure rear end wall 50 have leg walls 75–2 which extend towards the enclosure front end wall 51, and provide stacking seats for the legs 69 of the upper box unit 12 desired to be stacked upon the lower box unit 12, shown in Figs. 5 and 6. Similar box units may be stacked one on another irrespective of the direction of the front of either box.

The box unit 12 is furthermore preferably provided with an upwardly extending loop handle 77 which as shown is formed of metal rod and includes a horizontal central catch portion 77–1 from opposite ends of which extend angled leg portions 77–2 and 77–3. The catch portion 77–1 is spaced above the upper end of the box rear end wall 50 and the leg portions 77–2 and 77–3 extend downwardly from the catch portion 77–1 and are connected with the upper end of the end wall 50 on its inner face.

Figure 8:
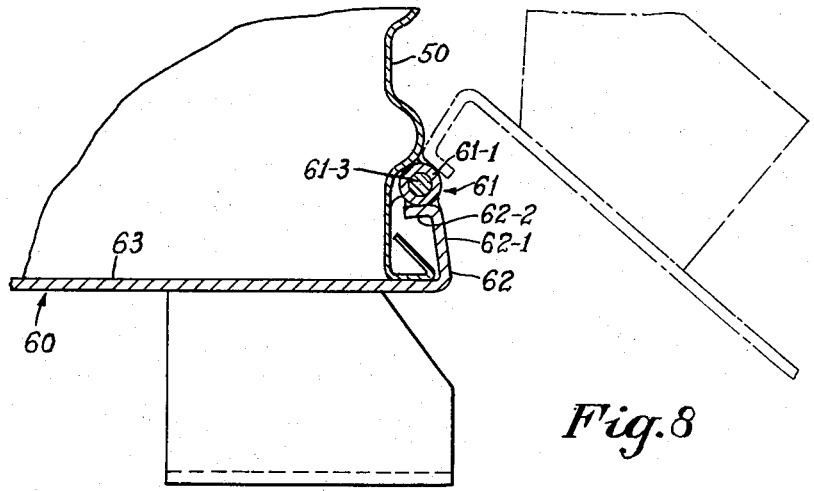
Fig. 8 is an enlarged fragmentary sectional view thereof as on line 8—8, Fig. 7, and showing in dot-dash lines the position of the bottom of the box unit in its extreme open position.

As best shown in Figs. 7 and 8, the improved hinge means 61 connecting the rear end 62 of the closure means 60 with the lower portion of the rear end wall 50 of the box unit 12 includes the following described construction.

The rear end 62 of the closure means 60 includes a laterally extending web wall 62–1 extending upwardly from the rear edge of the chute bottom wall 63. From the upper edge of the web 62–1 a flange wall 62–2 extends towards the enclosure rear end wall 50. A pair of laterally spaced axially aligned tubes 61–1 are connected upon the outer face of the flange wall 62–2. Three laterally spaced axially aligned tubes 61–2 are connected upon the lower portion of the outer face of the box rear end wall 50. The lateral spacing of the tubes 61–2 is such as to receive therebetween in axial alignment the tubes 61–1. A hinge rod 61–3 extends through the axially aligned bores of the tubes 61–1 and 61–2. The height of the web wall 62 is such that the upper face of the chute bottom wall 63 abuts the lower ends of the box side and end walls when the chute closure is in the closed position, as shown in Figs. 5 and 6.

From a broad standpoint the improved bottom dump box unit 12 may be stated as including side and end walls forming a rectangular enclosure having an upper end opening and a lower end opening, a bottom closure for the lower end opening, a hinge connection of the bottom closure with one of the enclosure walls, and end supports for the box unit, one set of end supports being adjacent the hinge connection, and an opposite end support being on the enclosure wall opposite the hinge connection and beyond the adjacent end of the bottom closure.

Figure 9:
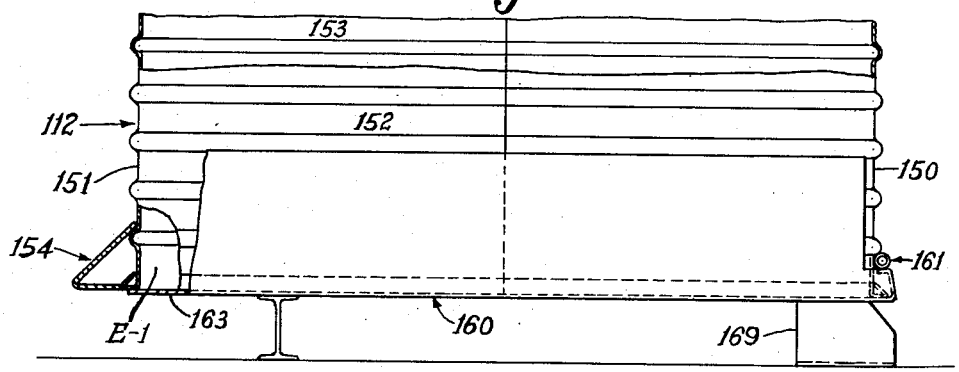
Fig. 9 is a fragmentary view similar to Fig. 6 showing another embodiment of the improved bottom dump box unit.

Another embodiment of an improved bottom dump box unit including the present improvements is shown in Fig. 9 and indicated generally by 112. The dump box unit 112 is generally similar to the dump box unit 12, including spaced rear and front end walls 150 and 151 and spaced side walls 152 and 153. The side and end walls are connected with each other at corners and form a rectangular enclosure E–1 having a lower opening which is the same area as its upper opening. The dump box unit 112 includes a closure chute 160 having a hinge connection 161 with the lower portion of the rear end wall 150. The bottom wall 163 of the closure chute 160 extends across the lower end opening of the enclosure E–1, and on the outer face of the lower end of the front end wall 151 there is mounted a horizontally extending support member 154. A pair of legs 169 extend below the bottom face of the chute bottom wall 163 adjacent the hinge connection 161.

The improved dump box unit 112 may be broadly described by the above broad description of the dump box unit 12.

Each of the dump box units 12 and 112 have parts and members preferably formed of metal and the connections of these parts and members with each other are preferably welds.

In the modified form of improved material handling apparatus illustrated in Figs. 15 to 18, the improved box and stand combination is indicated generally at 210 including an improved stand unit generally indicated at 211 and an improved bottom dump box unit generally indicated at 212. The stand 211 is generally similar to the stand 11 except that the forward strut members or posts 241 and 242 are higher than the posts 41 and 42 and the angle cross member 243 is reversed so that its upwardly extending stop flange 245 is at the rear edge of the bottom seat flange 244. The rear seat plates 236 and 239 are similar to the seat plates 36 and 39 excepting that they omit rear upwardly extending stop flanges.

On either side of the stand 211, a side plate 259 is provided extending upwardly and to the rear of each post or strut 241 and 242 and the side plates 250 are provided with a series of aligned apertures 251, 252 and 253 which selectively receive a removable cross rod 254.

A slidable gate plate 264 is mounted on the front of the struts 241 and 242 engaged by clips 255 and adjustable to selective vertical locations by bolts 256 received in any one of apertures 257 located in strut members 241 and 242.

Figure 18:
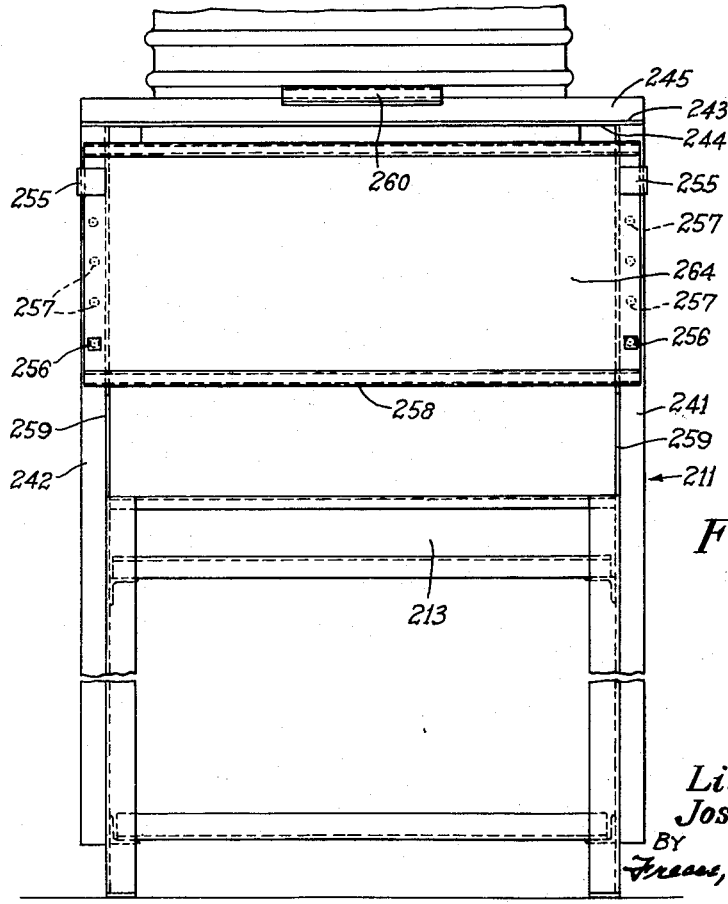

Referring to Fig. 18, by adjusting the gate plate member 264, the opening below the bottom edge 258 thereof can be varied. This opening constitutes the discharge aperture through which material contained in the box 212 flows from the box onto the stand or pan member 213 and it may be desired in certain instances, depending upon the character of material handled by the box 212 and the angularity of the bottom of the box, to change the size of this discharge aperture.

Likewise, the plates 259 forming the side walls of the pan portion 213 of the stand 211 are tapered upwardly from the front to rear so as to prevent side spillage of material discharged from the box 212.

Figure 15:
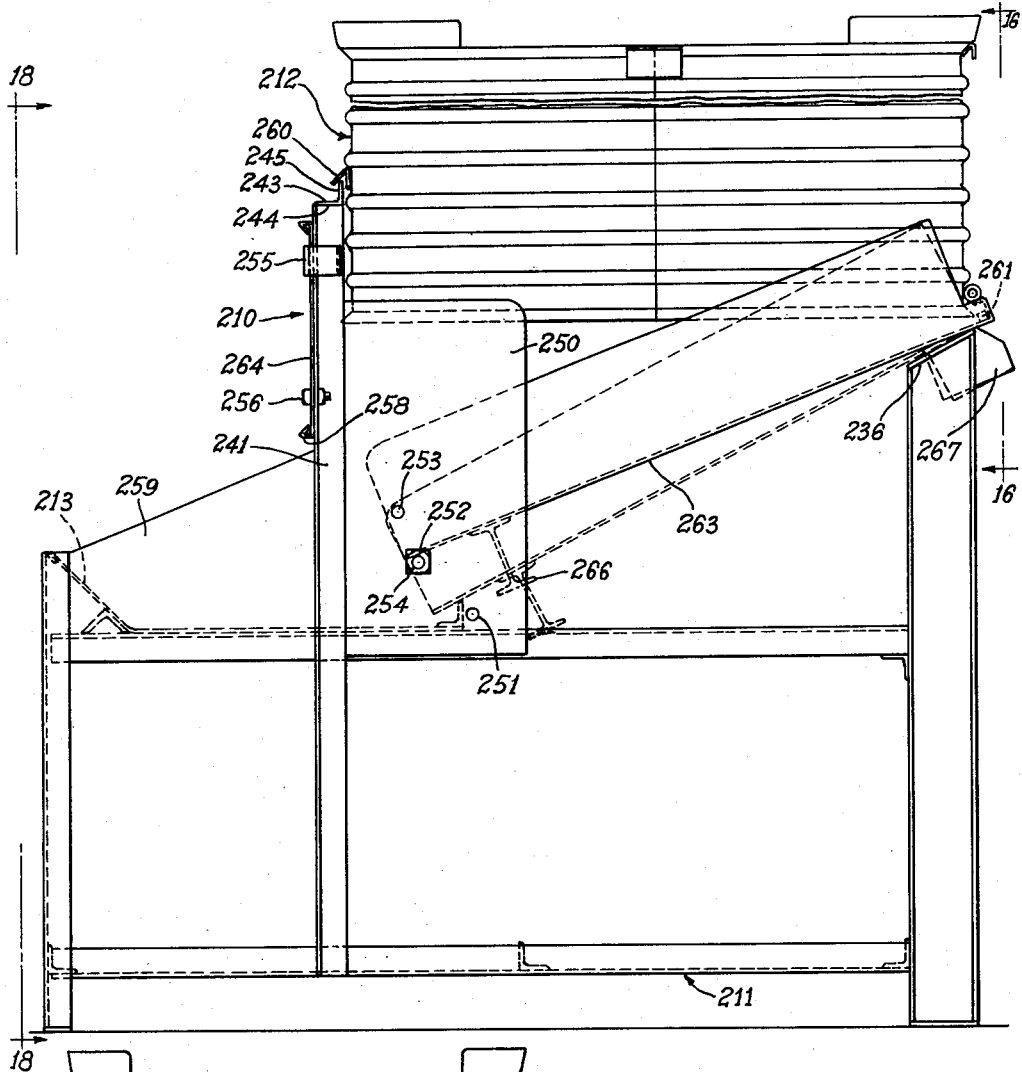
Fig. 15 is a side elevation, with parts broken away and in section, of another modified form of bottom dump box and positioning stand incorporating the improvements of the present invention with the box supported on the stand and the box bottom in one position of material discharge adjustment.

The box 212 is generally similar to the box 12 except that the bottom member 263 extends full length of the box 212 from rear to front and the support and baffle member 54 of the box 12 is eliminated. In its place, an angular member 260 is mounted on the front end wall of the box so as to engage over the flange 245 of the cross member 243 to support the front end of the box on the stand, as shown in Fig. 15. Thus, the angular projecting portion of the angle member 260 is located forwardly of the front end of the bottom member 263 to act as a support for the box on the stand 211 independent of the box bottom member 263.

The box bottom member 263 is further modified over the construction shown in Fig. 6 in that blocks 261 are provided at the rear corners of the bottom member 263 immediately under the rear corners of the box 212 when the box is closed; and to accommodate the blocks 261, the web wall 262 is increased in height so that the hinge connection 265 is located and formed in the same manner as the hinge connection 61 on the box 12. In this manner, as shown in Fig. 17, the bottom 263, when closed and when the box is in a normally horizontal position, slants downwardly rearwardly to a degree determined by the thickness or the height of the blocks 261.

Frequently the materials being handled such as stampings or turnings may have some residual lubricating compound or fluid thereon which settles to the bottom of the box and if the box is being handled by a lift truck or other handling means this settled fluid may slosh out the front of the box bottom if the bottom is level when the box is level. The slight rearward slant of the box bottom as shown in Fig. 17 forms a holding pocket at the rear of the box for such liquid to prevent it from sloshing from the front of the box during handling.

Figure 17:
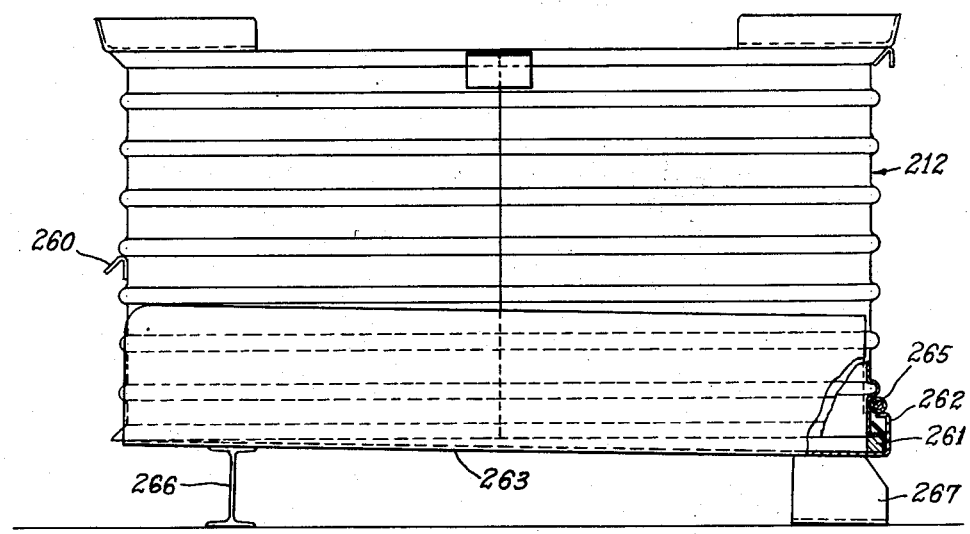
Fig. 17 is a side elevation of the box unit shown in Figs. 15 and 16 located in free standing position on a selected supporting surface, with certain parts broken away and shown in section; and, Fig. 18 is a fragmentary front elevational view with portions broken away and shown in section, looking in the direction of the arrows 18—18, Fig. 15.

In order to compensate for the height of the blocks 261 and provide for supporting the box 212 in a horizontal position, when the box is in free standing position on any selected horizontal surface, the height of the supporting and stop member 266 is increased over the height of the rear legs 267 by the amount of the height of the blocks 261, as shown in Fig. 17.

Figure 16:
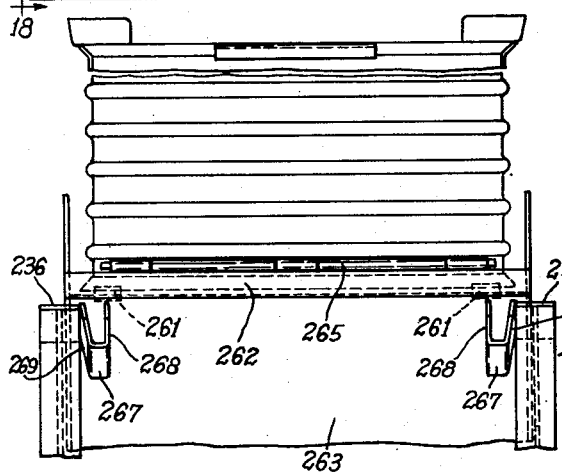
Fig. 16 is a fragmentary end elevational view with parts broken away and in section, looking in the direction of the arrows 16—16, Fig. 15.

Referring to Fig. 16 in comparison with Fig. 7, the rear legs 267 are mounted on the rear end of the box bottom 263 in a reverse arrangement. That is to say, the vertical legs 268 of the leg members 267 face each other and are located immediately below the blocks 261 so that when any series of boxes are tiered one upon another, the load of the upper boxes in the tier is carried through the lower box side walls, the blocks 261, the bottom wall 263 and vertical leg walls 268 directly to the supporting surface without placing any strain on the hinge connection 265.

Furthermore, the outer angled leg walls 269 of the channel shaped leg members 267 slant outwardly upwardly so as to assist in centering the rear end of the box 212 as it is placed on the stand 211.

Referring particularly to Fig. 15, with the form of box and stand construction shown therein, the angularity of the bottom wall 263 of the box 212 may be varied to suit the type of material being handled in the box. When the rod 254 is located in the storage location in holes 251, the box bottom 263 can be lowered to a maximum angle of inclination as shown in dotted lines in Fig. 15. If it is desired to reduce this angle of inclination, the rod 254 may be placed in the aligned holes 252 so as to engage the front end of the box bottom 263 as it is lowered, in an intermediate position as shown in full lines in Fig. 15. If it is desired to further reduce the angle of inclination of the box bottom, this may be done by locating the rod 254 in the top series of holes 253.

Obviously, depending upon the desired angle of inclination of the box bottom when open and the character of material being handled and discharged from the box, the gate member 264 may be adjusted to provide the desired size of discharge aperture.

The use of the improved material handling equipment combination of the present invention or discovery, referring to the combination 10 including the stand unit 11 and the dump box unit 12, is as follows:

In the combination 10, the stand 11 is dimensioned to accommodate the bottom dump box unit 12, and the combination 10 is shown in Fig. 10 just after the fork 80, as shown in dot-dash lines, of a fork lift truck has lowered the bottom dump box unit 12 onto the stand, and before commencement of the dropping of the bottom closure chute 60. The rear end corners of the chute bottom wall 63 are seated on the seat plates 36 and 39 at the upper ends of the uprights 14 and 15. The legs 69 are spaced inwardly from the sides of the chute 60, so as to permit the seating of the rear end corners of the chute bottom wall 63 on the seat plates 36 and 39.

The support and baffle member 54 when the dump box unit 12 is lowered to the position as shown in Fig. 10 is centered by the members 46 and 47 of the cross member 43 of the stand 12.

The tips 81 of the forks 80 extend into the channel or trough of the supporting and stop means 65, that is the trough formed by the rear side of the I-beam member 65, whereby, during lowering, the forks 80 are prevented from slipping forwardly beneath the stop means 65.

In Fig. 10, the bottom closure chute 60 for the bottom dump box unit 12 is still in its closed position. In Fig. 11, the bottom closure chute 60 is shown in an intermediate position, after partial lowering of the forks 80 of the fork lift truck.

During lowering of the bottom closure chute 60, material in the box 12 strikes against the sloping top wall 56 of the support and baffle member 54 of the box 12, and the material is thus caused to flow downwardly from the chute 60 into the interior of the upwardly opening pan 13.

When the forks 80 are lowered to the position shown in Figs. 12 and 13, the bottom closure chute 60 of the dump box unit 12 has dropped to its lowermost position, with the front end of the chute bottom wall 63 beyond the support and stop member 65 resting on the top of the stringer flange 34 extending upwardly above the bottom wall of the pan 13.

The relative positions of the parts of the improved material handling equipment combination 10, when the bottom closure chute has dropped to its lowermost position, as shown in Figs. 12 and 13, are also shown in perspective in Fig. 1; this figure and Figs. 10 to 13, inclusive, thus clearly illustrate one important characteristic of the improved material handling equipment 10, in that the bottom closure chute 60 may be manipulated at will independently of the supporting of the enclosure walls of the box unit 12 by the stand 11, after the box unit 12 has been positioned as shown in Fig. 10.

In Fig. 2 there is illustrated a fork lift truck unit 83 having forks 80 which are shown extending from the side beneath the bottom closure chute 60 of the box unit 12 and supporting the box unit 12 above the stand 11.

Thus in the improved material handling equipment 10, the handling of the box unit 12, and the manipulation of its closure chute 60 may be done by the forks of a fork lift truck entering beneath the box unit 12 from either side or from the rear end thereof, or the fork may be entered in the clearance space provided by the legs 69 and stop member 65 from either rear corner of the box.

The box units 12, as above described, are more frequently handled by fork lift trucks. However, the provision of the notches 73 in the rear end of the box units, combined with the spacing of the supporting and stop member 65 rearwardly from the front end of the chute bottom wall 63, provides for handling each box unit 12 with a sling from a crane.

The improved material handling apparatus illustrated in Figs. 15 to 18 is used in the same manner as described in connection with Figs. 1 through 14 in that it can be handled by a fork lift truck entering in the clearance space below the bottom from either side or the rear or either rear corner and positioned on the stand by the truck. After positioning and supporting the box on the stand, when the lift truck forks are lowered, the box bottom drops downwardly to a chute position, the angularity of which is determined by the rod 254.

The elimination of the baffle from the box 212 permits large sized objects to be handled in the box 212 without jamming in the bottom opening thereof due to any constrictions which might result when a baffle is present.

The improved construction of the material handling apparatus of the present invention by which the box is supported on the stand independently of the box bottom or in such manner that the bottom may be independently manipulated has a number of important advantages.

Thus, all types and kinds of materials may be handled in the box and for different materials it may be desirable or necessary to change the angle of inclination of the bottom when it is dropped to form a chute as in the various positions shown in Fig. 15. If a greater angle of inclination is desired, it is only necessary to change the location of rod 254. Furthermore, this angle of inclination is independent of the under-clearance provided on the box below the box bottom wall, which is determined by the height of the cross member on the front of and of the legs at the rear corners of the box bottom wall.

The improved construction, in so far as providing a support for the box on the stand is concerned, does not require any under-clearance, and from one standpoint the box could be handled from crane hooks engaging in eyes mounted on the top edges of the chute side walls with the bottom cross member and legs omitted.

However, in order to permit manipulation of the box with a fork lift truck, it is necessary to provide some under-clearance, but with the improved construction this under-clearance may be held to the minimum amount required for proper insertion of the fork of the lift truck. At the same time it is important to have a minimum under-clearance because floor space in most plants where the improved material handling apparatus is used is valuable and when the boxes are tiered, it is desirable to provide a maximum number of boxes in any stack or tier consistent with the operating limits of the fork lift truck handling equipment.

The desired angle of inclination of the box bottom when on a stand is not only independent of the support of the box on the stand and the under-clearance provided for the box, but it is also independent of the box length and width. Thus, the improved construction has maximum flexibility in use. Of course it is to be understood that the angularity or slope provided by the seat plates on the rear struts for any installation will accommodate any desired angle of inclination of the bottom when it forms a chute, and at the same time these seat plates form a solid support for the rear end of the box.

Furthermore, the box bottom when dropped to form a chute is solidly supported at its front end because the front end thereof throughout its width rests on the upstanding flange of the cross stringer on the stand or on the adjustable rod. Similarly, the front end of of the box is solidly supported on the stand on the cross member mounted on the forward struts.

As previously indicated, the box may be positioned on the stand by a fork lift truck approaching from either side of or the rear of the stand and as the box is lowered onto the stand, it is centered not only at the front by the centering means 46 and 47 but at the rear by the rear legs moving downward within the confines of the strut members.

The baffle plate or member 54 of the present invention when used also provides several important functions, first, in forming the means within the confines of the periphery of the box for supporting the front end of the box rigidly on the stand, and second, in assisting in properly directing the flow of material in the box as it flows from the box to the chute and down the chute into the pan 13. The rearward downward inclination of the portion 58 of the baffle member 54 directs the material at the front of the box rearwardly to the bottom opening so as to blend, smooth or deter the material flow from sudden or overwhelming on-rushes.

The particular construction and arrangement of the hinged connection between the bottom of the box is also of importance in that strong welded connections can be made between the hinge tubes 61–1 and bottom flange wall 62–2 and between the hinge tubes 61–2 and the rounded portion beneath a corrugation in the rear wall 50 of the box unit 12. Furthermore, as shown in dot-dash lines in Fig. 8, the box bottom 60 can swing through more than 90° which is an aid in manipulating the bottom to dump the contents of the box.

It is, of course, to be understood that the improved box construction of the present invention has many uses and advantages independent of use with or positioning the same on a stand. For instance, the box may be used to move or store unit loads of virtually any material from place to place or from operation to operation. Such moving can be accomplished either with a fork lift truck or with a crane. When the boxes are being manipulated or handled by a fork lift truck, controlled dumping of the contents of the box at any desired place or location can be obtained in the manner disclosed in the Riemenschneider et al. Patent No. 2,445,038.

When the box is used on the stand for serving an operator performing some operation, the operator has handy access, without stooping or bending, to the supply of materials discharged to the pan. The operator is supplied with a continuing flow of material ideally placed because when the box is empty enough material remains in the pan to supply the operator while the empty box is being replaced with a loaded one. In this manner, the operator's efficiency is boosted because fatiguing movements are avoided and idle time waiting for supplies is eliminated.

Accordingly, the improvements of the present invention provide a dumping box construction for use in materials handling which is adapted for operation or use in every way in which prior materials handling boxes have been used requiring a specific type of box for each particular character of use. The box thus has universality of application.

Moreover, the present invention provides an improved materials handling box and positioning stand combination having the many advantageous features described.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved constructions illustrated and described herein are by way of example, and the scope of the present invention or discovery is not limited to the exact details of construction set forth.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

We claim:

1. Material handling apparatus including a bottom dump box and a positioning stand for the box, the box including side walls forming upper and lower box openings, a bottom member for the lower opening, a hinge connection between the bottom and one of the box side walls, support members on the bottom providing clearance between the bottom member and a supporting surface when the box is positioned in free standing condition on any selected supporting surface, and other support means on the box independent of said bottom support members including spaced seat engaging portions adjacent the hinge connection, and abutment means located above the plane of and beyond the end of the bottom member opposite its hinged connection and projecting from the box adjacent the box wall opposite that wall having said hinge connection; and the stand including a pan, spaced support seats on the stand at the rear of the pan, said spaced support seats cooperating with said box seat engaging portions and abutment means when the box is positioned on the stand, said spaced support seats and box support means holding the box above and to the rear of the pan and permitting swinging movement of the bottom on its hinge through an arc determined by the distance that the box is supported by said spaced support seats above the pan and independent of the free standing bottom support members.

2. Material handling apparatus as set forth in claim 1, in which the bottom support members include spaced rear legs and a laterally extending front stop member spaced from the legs, the legs and stop member projecting downward from the bottom member, and in which the stand support seats include spaced rear seats and a forward cross member receiving the box support means, whereby the box may be handled and manipulated by the fork of a lift truck engaging the bottom in the clearance space provided below the bottom by said support members, and whereby the lift truck fork may be entered in said clearance space from the rear or either side or either rear corner of the box.

3. Material handling apparatus as set forth in claim 1, in which the stand includes spaced forward and rear pairs of laterally spaced upwardly extending struts, and in which a separate support seat is provided on each rear strut and a cross member is mounted on the forward struts forming a forward support seat.

4. Material handling apparatus as set forth in claim 1, in which the stand includes a rear pair of laterally spaced upwardly extending struts, and in which a separate forwardly downwardly angled support seat is provided on each rear strut.

5. Material handling apparatus as set forth in claim 1, in which the stand includes a forward pair of laterally spaced upwardly extending struts, and in which an angle cross member is mounted on the forward struts forming a forward support seat.

6. Material handling apparatus as set forth in claim 1, in which the stand includes a forward pair of laterally spaced upwardly extending struts, in which an angle cross member is mounted on the forward struts forming a forward support seat, and in which said cross member is provided with centering means engaging the front corners of the box when the box is positioned on the stand.

7. Material handling apparatus as set forth in claim 1, in which the bottom member includes a plate member, in which the rear corners of said plate member adjacent the hinge connection provide spaced rear support means for the box, and in which an angular member is mounted on the front wall of the box beyond the front end of the plate member forming forward support means for the box.

8. Material handling apparatus as set forth in claim 1, in which an angular support and baffle member extend from the front wall of the box between the side walls thereof and within the box, said angular member including a flat bottom wall and a downwardly inwardly angled wall, said flat bottom wall providing forward support means for the box, and said angled wall providing a baffle controlling the flow of material from the box.

9. Material handling apparatus as set forth in claim 1, in which the bottom support members include spaced rear legs adjacent the box hinge connection, and a laterally extending front stop member spaced from the legs, the legs and stop member projecting downward from the bottom member, and the stop member having a rearwardly directed flange spaced below the bottom member.

10. Material handling apparatus as set forth in claim 1, in which the bottom member includes a plate member, in which the bottom support members include spaced rear legs and a laterally extending front stop member spaced from the legs, the legs and stop member projecting downward from the bottom plate, in which the box support means include rear corner portions of the bottom plate between the legs and sides of the plate, and an angle member mounted on and extending from the front wall of the box beyond the front end of the bottom plate, and in which the stand support seats include spaced rear seats receiving the box support means with the box support legs located laterally between said rear seats, and in which the said stand support seats also include a forward cross member receiving the angle member extending from the front wall of the box.

11. Material handling apparatus as set forth in claim 1, in which the bottom member includes a bottom plate terminating at its rear end in an upwardly extending web wall terminating in a forwardly extending flange, and in which the hinge connection includes pivoted members mounted on said flange and on the rear wall of the box above the lower end thereof.

12. Material handling apparatus as set forth in claim 1, in which the bottom member includes a bottom plate and side plates extending upwardly therefrom along the outer sides of the box when the bottom is closed, whereby the bottom and side plates form a chute for the box when the bottom member moves on its hinge connection to angled position with respect to the box.

13. Material handling apparatus as set forth in claim 1, in which the stand pan is provided at its rear edge with an upstanding flange wall, in which the box bottom member includes a bottom plate and upwardly extending side plates, and in which the bottom plate is shorter than the box from front to rear, and the front end of said bottom plate rests on the upstanding pan flange wall when the box is mounted on the stand and the bottom member swung on its hinge connection.

14. Material handling apparatus as set forth in claim 1, in which the bottom support members include spaced rear legs and a laterally extending front stop member spaced from the legs, the legs and stop members projecting downward from the bottom member, the stop member being spaced rearwardly of the front end of the bottom member, the rear ends of the legs being notched forwardly of the bottom member, whereby the box may be handled by crane slings engaged in said leg notches and with said bottom member forward of said stop member, and flanged angled tiering seat members mounted at the top four corners of the box.

15. Material handling apparatus including a bottom dump box and a positioning stand for the box, the box including side walls forming upper and lower box openings, a bottom member for the lower opening, a hinge connection between the bottom and one of the box side walls, spaced stand engaging support means on the box including spaced seat engaging portions adjacent the hinge connection, and abutment means located above the plane of and beyond the end of the bottom member opposite its hinged connection and projecting from the box adjacent the box wall opposite that wall having said hinge connection; and the stand including a pan, spaced support seats on the stand at the rear of the pan, said spaced support seats including spaced rear seats and a forward cross member respectively receiving said box seat engaging portions and abutment means and cooperating therewith when the box is positioned on the stand to hold the box above and to the rear of the pan thereby permitting swinging movement of the bottom on its hinge through an arc determined by the distance that the box is supported by said spaced support seats above the pan.

16. Material handling apparatus as set forth in claim 15, in which the box bottom member includes a bottom plate and upwardly extending side plates, in which the stand is provided with a cross member spaced from said stand support seats, and in which the front end of said bottom plate rests on said cross member when the box is mounted on the stand and the bottom member swung on its hinge connection.

17. Material handling apparatus as set forth in claim 15, in which means are provided on the bottom member holding the bottom member in downwardly rearwardly angled position with respect to the lower box opening when the bottom is in closed position.

18. Material handling apparatus as set forth in claim 15, in which spacer means are provided on the bottom member between the rear end thereof and the lower rear edges of the box, in which the box is provided with support members comprising spaced rear legs projecting from the bottom adjacent and beneath said spacer means and a laterally extending stop member projecting from the bottom adjacent to but spaced from the front edge thereof, and in which said stop member has a greater height than said rear legs thereby maintaining the bottom member in downwardly rearwardly angled position when the bottom is closed.

19. Material handling apparatus as set forth in claim 15, in which the spaced stand engaging support means on the box include a laterally extending angle member mounted exteriorly on the front wall of the box intermediate the top and the bottom edges thereof.

20. Material handling apparatus as set forth in claim 15, in which the spaced stand engaging support means on the box include a laterally extending angle member mounted exteriorly on the front wall of the box intermediate the top and bottom edges thereof, and in which spaced support members are provided on the bottom member including spaced rear legs having upwardly and outwardly tapered outside surfaces forming centering means received between the spaced rear stand seats.

21. Material handling apparatus as set forth in claim 15, in which the stand includes adjustable means engaged by the box bottom in predetermined selected positions when the bottom is swung on its hinge connection.

22. Material handling apparatus as set forth in claim 15, in which the stand includes spaced side plates, a series of aligned apertures formed in said side plates, a cross rod member mounted selectively in one of said series of aligned apertures, and said rod member supporting the front end of the box bottom when swung on its hinge connection to a material discharge position.

23. Material handling apparatus as set forth in claim 15, in which the stand includes a laterally spaced forward pair of upwardly extending struts, in which a cross member is mounted on the struts forming a forward support seat for the box, and in which an adjustable gate plate is mounted on the struts below said cross member to vary the discharge aperture from the box to the pan when the box bottom is swung on its hinge connection.

24. Material handling apparatus adapted for storing materials, transporting materials from place to place, dumping materials with a fork lift truck, and positioning and discharging materials at a convenient level, including side walls forming upper and lower box openings, a bottom member for the lower opening, a hinge connection between the bottom and one of the box side walls, said hinge connection being located above the lower end of the box, support members on the bottom member providing clearance between the bottom member and a supporting surface when the box is positioned in free standing condition on any selected supporting surface, said support members comprising spaced rear legs projecting from the bottom member adjacent said hinge connection and a laterally extending stop member having a rearwardly directed flange spaced from the bottom member projecting from the bottom member adjacent to but spaced from the front edge thereof, and other support means on the box independent of said bottom support members, said other support means including rear corner portions of the bottom member laterally outside of said legs and an angle member mounted on and projecting from the front box wall beyond the forward end of the bottom member and above the plane thereof.

25. Material handling apparatus as set forth in claim 24, in which the support means angle member comprises an angular support and baffle device extending from the front wall of the box between the side walls thereof and within the box, and in which said device includes a flat bottom wall and a downwardly inwardly angled wall, said flat bottom wall providing forward support means for the box, and said angled wall providing a baffle controlling the flow of material from the box.

26. Material handling apparatus as set forth in claim 24, in which the bottom member includes a bottom plate terminating at its rear end in an upwardly extending web wall terminating in a forwardly extending flange, and in which the hinge connection includes pivoted members mounted on said flange and on the rear wall of the box above the lower end thereof.

27. Material handling apparatus as set forth in claim 24, in which the box bottom member includes a bottom plate and upwardly extending side plates, in which the bottom plate is shorter than the box from front to rear, and in which flanged angled tiering seat members are mounted at the four top corners of the box receiving the bottom support members of a similar box when a plurality of such boxes are stacked one on top of another.

28. Material handling apparatus as set forth in claim 24, in which the stop member is spaced rearwardly of the front end of the bottom member, and in which the rear ends of the legs are notched forwardly of the bottom member, whereby the box may be selectively handled by a fork lift truck entering its forks from the sides, back or rear corners of the box or by crane slings engaged in said leg notches and with said bottom member forward of said stop member.

29. Material handling apparatus adapted for storing materials, transporting materials from place to place, and positioning and dumping materials, including side walls forming upper and lower box openings, a bottom member for the lower opening, a hinge connection between the bottom and one of the box side walls, said hinge connection being located above the lower end of the box, spaced stand engaging support means on the box including rear corner portions of the bottom member and an angle member mounted on and projecting from the front wall of the box beyond the front end of and above the plane of the bottom member forming forward stand engaging support means for the box.

30. Material handling apparatus as set forth in claim 29, in which the bottom member includes a bottom plate and upwardly extending side plates, in which the bottom plate is hinged to the box, and in which means is provided between the hinged bottom plate and box constructed so that the bottom plate when closed is angled slightly downwardly and rearwardly of the box.

31. Material handling apparatus as set forth in claim 29, in which support members are provided on the bottom member forming clearance between the bottom member and a supporting surface when the box is positioned in free standing condition on any selected supporting surface, said support members comprising spaced rear legs projecting from the bottom member adjacent said hinge connection and a laterally extending stop member having a rearwardly directed flange spaced from the bottom member projecting from the bottom member adjacent to but spaced from the front edge thereof, in which block means are mounted on the bottom member above the rear legs and below the lower rear edges of the box to angle the bottom member downwardly rearwardly when the bottom is closed, and in which the height of said legs is less than the height of said stop member by the amount of the height of said block means.

32. Material handling apparatus as set forth in claim 29, in which support members are provided on the bottom member, including spaced rear legs projecting from the bottom member adjacent said hinge connection, in which said legs comprise channel members secured to the bottom member, said channel members including a vertical channel leg and an angular channel leg secured to the bottom member, and in which the vertical channel leg is located beneath a rear corner wall portion of the box.

33. Material handling apparatus as set forth in claim 29, in which the spaced stand engaging support means on the box include a laterally extending angle member mounted exteriorly on the front wall of the box intermediate the top and bottom edges thereof.

34. Material handling apparatus including side walls forming upper and lower box openings, a bottom member for the lower opening, a hinge connection between the bottom and one of the box side walls, said hinge connection being located above the lower end of the box, support members on the bottom member providing clearance between the bottom member and a supporting surface when the box is positioned in freestanding condition on any selected supporting surface, said support members comprising spaced rear legs projecting from the bottom member adjacent said hinge connection and a laterally extending stop member having a rearwardly directed flange spaced from the bottom member projecting from the bottom member adjacent to but spaced from the front edge thereof, said stop member being spaced rearwardly of the front end of the bottom member, and the rear ends of said spaced rear legs being notched forwardly of the bottom member, whereby the box may be selectively handled by a fork lift truck entering its forks from the sides, back or rear corners of the box or by crane slings engaged in said leg notches and with said bottom member forward of said stop member.

35. Material handling apparatus including side walls forming upper and lower box openings, a bottom member for the lower opening, a hinge connection between the bottom and one of the box side walls, said hinge connection being located above the lower end of the box, support members on the bottom member providing clearance between the bottom member and a supporting surface when the box is positioned in free-standing condition on any selected supporting surface, said support members comprising spaced rear legs projecting from the bottom member adjacent said hinge connection and a laterally extending stop member having a rearwardly directed flange spaced from the bottom member projecting from the bottom member adjacent to but spaced from the front edge thereof, block means mounted on the bottom member below the lower rear edge of the box to angle the bottom member downwardly rearwardly when the bottom is closed, and the height of said legs being less than the height of said stop member by the amount of the height of said block means.

References Cited in the file of this patent

UNITED STATES PATENTS

| Number | Name | Date |
|---|---|---|
| 1,038,923 | Mathy | Sept. 17, 1912 |
| 1,742,738 | Turner | Jan. 7, 1930 |
| 1,875,141 | Powell | Aug. 30, 1932 |
| 2,335,572 | Schroeder | Nov. 30, 1943 |
| 2,440,056 | McIntyre et al. | Apr. 20, 1948 |
| 2,445,038 | Riemenschneider et al. | July 13, 1948 |

OTHER REFERENCES

Descriptive drawing "Industrial Stak Pallet"; Pallet Division, Industrial Washing Machine Corp., New Brunswick, N. J.; received by U. S. Pat. Off. Library Feb. 20, 1948.

Monroe Auto Equipment Co. Catalogue, under "Pallet Literature," received by U. S. Pat. Off. Library Mar. 17, 1948, showing Monroe Drop Borrom Skid Box on Form No. 794-10-47.

Powell Material Handling Equipment Bulletin No. 600, received by U. S. Pat. Off. Library Feb. 20, 1948 (may be seen under "Pallet Literature").